US007833385B2

(12) United States Patent
Fournier et al.

(10) Patent No.: US 7,833,385 B2
(45) Date of Patent: Nov. 16, 2010

(54) PROCESSES OF MAKING MONOHYDRATE FORM OF MAGNESIUM AMMONIUM PHOSPHATE AND PROCESSES OF MAKING PAPER USING SAME

(75) Inventors: Jay A. Fournier, Richmond, VA (US); Joshua Powell, Richmond, VA (US); John F. Cunningham, Richmond, VA (US); Warren D. Winterson, West Point, VA (US); Ulrike Becker, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 24 days.

(21) Appl. No.: 12/292,025

(22) Filed: Nov. 10, 2008

(65) Prior Publication Data
US 2009/0065161 A1  Mar. 12, 2009

Related U.S. Application Data

(62) Division of application No. 11/051,623, filed on Jan. 27, 2005, now abandoned.

(60) Provisional application No. 60/540,067, filed on Jan. 30, 2004.

(51) Int. Cl.
*D21H 17/63* (2006.01)
*C01B 21/097* (2006.01)

(52) U.S. Cl. .................... 162/181.2; 162/139; 162/158; 162/181.1; 162/185; 423/306

(58) Field of Classification Search ................ 162/139, 162/158, 181.1, 181.2, 185; 423/306
See application file for complete search history.

(56) References Cited

U.S. PATENT DOCUMENTS

| 2,116,910 A * | 5/1938 | Piccard ..................... 106/691 |
|---|---|---|
| 3,126,254 A | 3/1964 | Salutsky et al. |
| 3,141,732 A | 7/1964 | McCullough et al. |
| 3,285,731 A | 11/1966 | Salutsky et al. |
| 3,320,048 A | 5/1967 | Legal et al. |
| 3,348,910 A | 10/1967 | Goodenough et al. |
| 3,384,451 A | 5/1968 | Volz |
| 3,459,530 A | 8/1969 | Hudson |
| 3,476,510 A | 11/1969 | Kern et al. |
| 4,013,443 A | 3/1977 | Schuman |
| 4,153,441 A | 5/1979 | Guithues et al. |
| 4,402,986 A | 9/1983 | Sinkoff et al. |
| 4,436,555 A | 3/1984 | Sugama et al. |
| 4,457,773 A | 7/1984 | Sley |
| 4,460,555 A | 7/1984 | Thompson |
| 4,777,026 A | 10/1988 | Griffith |
| 4,828,495 A | 5/1989 | Bell et al. |
| 5,294,348 A | 3/1994 | Horny et al. |
| 5,374,294 A | 12/1994 | Moore |
| 5,595,597 A | 1/1997 | Fogel et al. |
| 5,613,465 A | 3/1997 | Moore |
| 6,289,898 B1 | 9/2001 | Fournier et al. |
| 6,476,082 B1 | 11/2002 | Green |
| 6,506,805 B2 | 1/2003 | Green et al. |
| 7,052,581 B2 | 5/2006 | Winterson et al. |
| 7,216,652 B1 | 5/2007 | Fournier et al. |
| 2002/0114753 A1 | 8/2002 | Green et al. |
| 2003/0056913 A1* | 3/2003 | Winterson et al. .......... 162/139 |
| 2003/0154991 A1* | 8/2003 | Fournier et al. ............. 131/194 |

FOREIGN PATENT DOCUMENTS

| JP | 05-319966 | 12/1993 |
|---|---|---|
| SU | 1234362 A | 5/1986 |
| WO | WO 02/14218 | 2/2002 |

OTHER PUBLICATIONS

A Scientific Report by The Faculty of Agriculture of Meijo University entitled: Studies on Exploitation of Seawater Resources (2) Magnesium Ammonium Phosphate Synthesized from Bittern.
A. K. Sarkar, "Hydration/dehydration characteristics of struvite and dittmarite pertaining to magnesium ammonium phosphate cement systems", J. Mater Sci. 26, pp. 2514-2518, 1991.
A. K. Sarkar, "Phosphate Cement-Based Fast-Setting Binders", Ceramic Bulletin 69, pp. 234-238, 1990.
F. Abbona et al., Crystallization of Two Magnesium Phosphates, Struvite and Newberyite: Effect of pH and concentration, Journal of Crystal Growth 57 (1982), pp. 6-14, North Holland Publishing Company.

(Continued)

*Primary Examiner*—Eric Hug
*Assistant Examiner*—Dennis Cordray
(74) *Attorney, Agent, or Firm*—Buchanan Ingersoll & Rooney PC

(57) ABSTRACT

Processes for producing the monohydrate form of magnesium ammonium phosphate in slurry from use of environmentally friendly reactants are described. Slurry containing the monohydrate form of magnesium ammonium phosphate can be fed directly to, and mixed with, paper making feedstock, such as feedstock for cigarette paper, without transformation of the monohydrate form to the hexahydrate form of magnesium ammonium phosphate.

14 Claims, 3 Drawing Sheets

OTHER PUBLICATIONS

A.W. Frazier et al., the Phase System $MgO\text{-}(NH_4)_2O\text{-}P_2O_5\text{-}H_2O$ at 25° C. Chemical Research Department, Tennessee Valley Authority; Ind Eng. Chem. Res., vol. 31, No. 8, 1992, pp. 2065-2068.

Notification of Transmittal of International Preliminary Examination Report for PCT/US02/24012 dated Nov. 12, 2003.

Written Opinion for PCT/US02/24012 dated Feb. 27, 2003.

Definition of "substantially", Merriam-Webster Online Dictionary, no date, [retrieved on Jul. 4, 2008], Retrieved from the Internet: <URL:http://www.merriam-webster.com/dictionary/substanially>.

* cited by examiner

PROCESSES OF MAKING MONOHYDRATE FORM OF MAGNESIUM AMMONIUM PHOSPHATE AND PROCESSES OF MAKING PAPER USING SAME

CROSS-REFERENCE TO RELATED APPLICATIONS

This application is a divisional of U.S. patent application Ser. No. 11/051,623, entitled PROCESS OF MAKING MONOHYDRATE FORM OF MAGNESIUM AMMONIUM PHOSPHATE AND PROCESSES OF MAKING CIGARETTE PAPER USING SAME and filed on Jan. 27, 2005 now abandoned which claims priority to U.S. Provisional Application No. 60/540,067 entitled PROCESS OF MAKING MONOHYDRATE FORM OF MAGNESIUM AMMONIUM PHOSPHATE AND PROCESSES OF MAKING PAPER USING SAME and filed on Jan. 30, 2004, the entire contents of both of which are hereby incorporated by reference.

BACKGROUND

Magnesium ammonium phosphate has been produced in solid form and is used primarily as a fertilizer. It is formed as a by-product in the treatment of waste water and in the making of magnesium phosphate cements.

SUMMARY

Processes of making the monohydrate form of magnesium ammonium phosphate ("dittmarite") are provided. The processes can produce dittmarite in an environmentally friendly manner.

An exemplary process comprises introducing at least magnesium, phosphorous and nitrogen into a vessel by introducing at least two reactants into the vessel, and reacting the at least two reactants to produce a slurry. In preferred embodiments, the solid portion of the slurry contains a high percentage of dittmarite.

Embodiments of processes of making paper, such as cigarette paper, use dittmarite containing slurries produced by reacting environmentally friendly non-caustic reactants. An exemplary process comprises combining the slurry with paper making feedstock in a paper making process. The slurry is preferably maintained under conditions that substantially prevent the transformation to struvite before it is combined with the paper making feedstock.

DETAILED DESCRIPTION OF PREFERRED EMBODIMENTS

Figure 1:
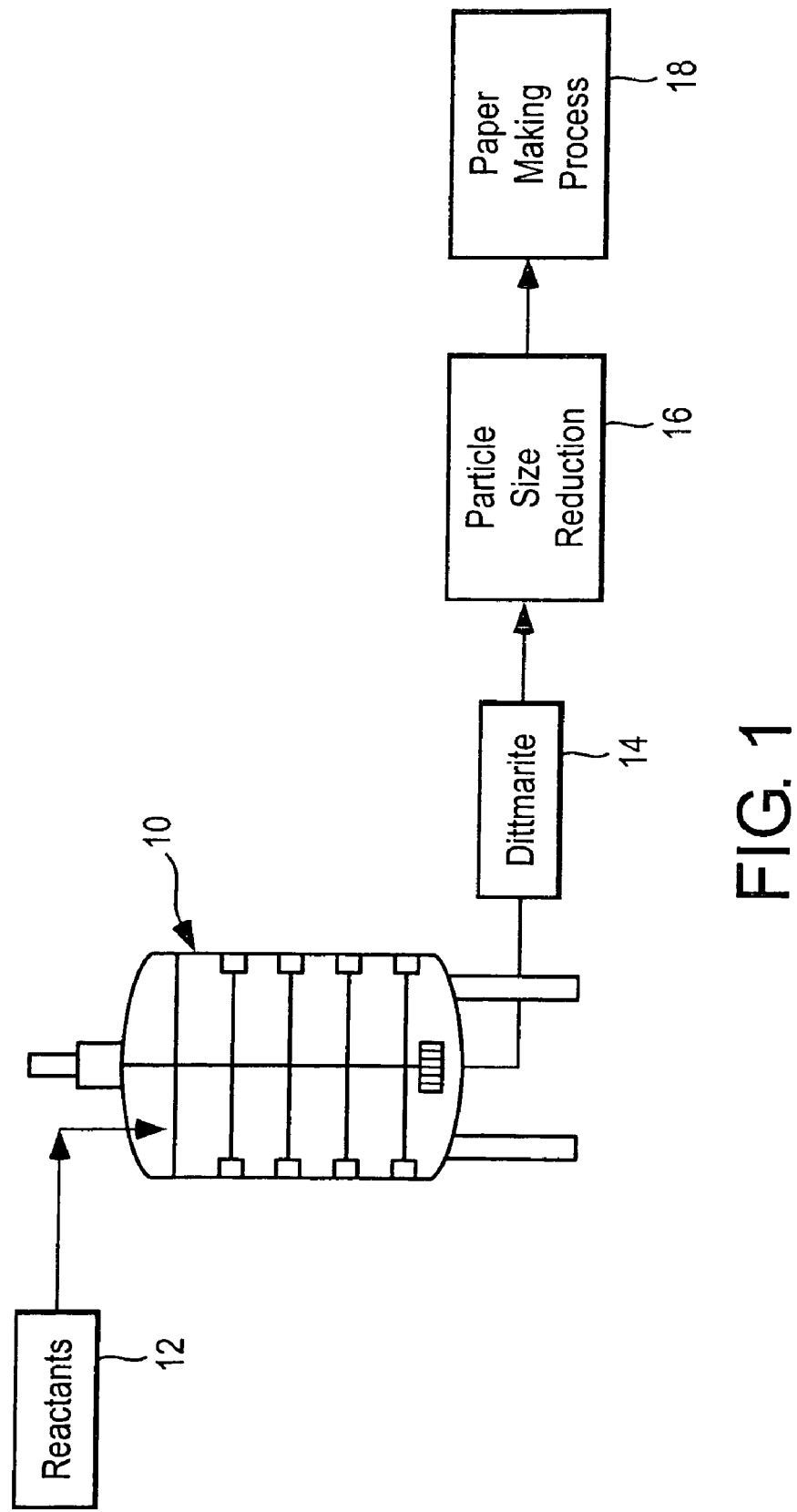
FIG. 1 illustrates an exemplary apparatus for practicing embodiments of processes that produce slurries comprising the monohydrate form of magnesium ammonium phosphate ("dittmarite") from environmentally friendly reactants and which feed the slurries to a cigarette paper making process.

Exemplary embodiments of processes of making magnesium ammonium phosphate (also referred to herein as "AMP") are described. The monohydrate form of AMP ($NH_4MgPO_4 \cdot H_2O$, or "dittmarite") can be produced by the processes.

Exemplary embodiments of the processes produce dittmarite by reacting environmentally friendly reactants, without using reactants like phosphoric acid that are used in known processes. The processes can produce dittmarite directly from the reaction of the environmentally friendly reactants. The dittmarite can have high purity.

Processes of making cigarette paper by producing dittmarite, and then combining the dittmarite with paper making feedstock in a paper making process, are described. These processes can utilize dittmarite in slurry form produced by reacting environmentally friendly reactants, by embodiments of the above-described processes. The dittmarite can be fed directly from the reactor vessel to the paper making process.

Dittmarite can transform to struvite below certain temperatures. By combining the as-produced dittmarite, while in slurry form and at a sufficiently high temperature, with the paper making feedstock in a paper making process, potential phase changes from dittmarite to struvite can preferably be substantially eliminated. Embodiments of the processes can reduce, and preferably substantially prevent, the occurrence of such phase changes by maintaining dittmarite in a slurry form at a sufficiently high temperature until it is combined with paper making feedstock.

In some embodiments of the processes, the as-produced dittmarite in slurry form can first be converted to a dried form of dittmarite. The dried magnesium ammonium phosphate can be stored and then reslurried when needed for later use. The reslurried magnesium ammonium phosphate can be combined with paper making feedstock in a paper making process, or used for other purposes.

Production of Dittmarite Slurries Using Environmentally Friendly Reactants

Current commercial processes for producing magnesium ammonium phosphate react magnesia and/or magnesium hydroxide, ammonium hydroxide and/or anhydrous ammonia, and phosphoric acid. Ammonium hydroxide, anhydrous ammonia, and phosphoric acid each pose environmental and safety issues. In addition, a strongly exothermic reaction occurs when phosphoric acid is added to the basic magnesium hydroxide mixture. Consequently, current processes that utilize these reactants require added safety precautions, which introduce added costs, handling procedures, and require special permits for practicing the processes.

Embodiments of processes of producing magnesium ammonium phosphate by reacting environmentally friendly reactants can overcome these problems. Exemplary embodiments of the processes do not utilize phosphoric acid, but rather utilize phosphate. Consequently, problems associated with using phosphoric acid are avoided.

Exemplary embodiments of the processes comprise introducing at least magnesium, phosphate and nitrogen into a vessel in which magnesium ammonium phosphate is to be produced. These components are reacted to produce a slurry containing magnesium ammonium phosphate.

Magnesium, phosphate and nitrogen can be introduced into the vessel in any suitable form or manner. For example, magnesium, phosphate and nitrogen can be provided by introducing at least two reactants into the vessel. In a preferred embodiment, the at least two reactants include at least one magnesium containing reactant, and at least one phosphate and nitrogen containing reactant. The at least one magnesium containing reactant is preferably magnesium hydroxide (Mg$(OH)_2$) and/or magnesium oxide (MgO). However, magnesium acetate and other suitable magnesium compounds can be used as the magnesium containing reactant. Magnesium acetate provides good particle size control, and by-product acetate can be readily recovered from the product.

The at least one magnesium containing reactant is preferably supplied to a reactor vessel in the form of an aqueous slurry. Magnesium hydroxide and magnesium oxide are completely insoluble in water. Dry powders of these magnesium compounds can be mixed with water to provide an aqueous slurry.

The phosphate containing compound is preferably ammonium dihydrogen phosphate ($NH_4H_2PO_4$). Ammonium dihydrogen phosphate provides a phosphate group ($PO_4$) and nitrogen for the reaction to produce magnesium ammonium phosphate. Ammonium dihydrogen phosphate is completely soluble in water (20 g/100 g at 25° C.). Thus, the phosphate can be added to the reactor vessel in aqueous form.

Preferably, dittmarite is produced by reacting magnesium hydroxide and/or magnesium oxide with ammonium dihydrogen phosphate. The reaction is conducted at boiling temperatures. For example, the reaction between magnesium hydroxide and ammonium dihydrogen phosphate is as follows:

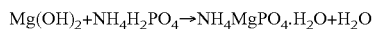

$$Mg(OH)_2 + NH_4H_2PO_4 \rightarrow NH_4MgPO_4 \cdot H_2O + H_2O$$

Referring to FIG. 1, reactants 12 are preferably added to reactor vessel 10 in aqueous form. The reactor vessel can be any suitable vessel capable of sustaining mild pressure levels, e.g., up to at least 100 psi, so that the reactants can be heated to desired elevated temperatures to form dittmarite 14 and to prevent the transformation of the dittmarite to struvite, as described below. For example, the reactor vessel 10 can include a jacket for heating and cooling, be rated for pressure operation up to at least 100 psi, have a sanitary construction for easy clean up, and include at least one agitator, e.g., two agitators. For example, one agitator can scrape the reactor vessel walls and create a uniform temperature mixture, and the second agitator can supply high shear to break up agglomerates and control particle size. In a preferred embodiment, the reactor vessel can be a sealable autoclave, which can be sealed to prevent exposure of the vessel contents to the ambient environment.

Magnesium hydroxide and magnesium oxide are completely insoluble in water. At least one of these compounds is preferably added to the reactor vessel in slurry form. Ammonium dihydrogen phosphate is completely soluble in water. Accordingly, ammonium dihydrogen phosphate is preferably added to the reactor vessel as an aqueous solution. Preferably, the magnesium hydroxide and/or magnesium oxide containing slurry is added to the reactor vessel before adding the ammonium dihydrogen phosphate to the reactor vessel.

The solids content of the magnesium hydroxide and/or magnesium oxide containing slurry added to the reactor vessel 10 can be selected based on different considerations. First, the slurry is preferably stirred both before it is added to the reactor vessel, and after it has been added. If the solids concentration of the magnesium hydroxide and/or magnesium oxide solids in water exceeds about 30 wt. %, a paste may form, which is difficult to stir. Accordingly, the solids content of the magnesium hydroxide and/or magnesium oxide containing slurry is preferably below 30 wt. %.

A second consideration is the desired concentration of solids in the magnesium ammonium phosphate containing slurry produced by the reaction. For example, if the magnesium ammonium phosphate containing slurry is supplied to a cigarette paper making process 18, the magnesium ammonium phosphate containing slurry can be pumped from the reactor vessel directly to paper making equipment. The concentration of solids in the magnesium ammonium phosphate containing slurry can be selected to achieve desired pumping and/or mixing with other ingredients supplied to the paper making equipment. The concentration of solids in the magnesium ammonium phosphate containing slurry preferably is no greater than about 25 wt. %, more preferably no greater than 20 wt. %, to achieve desired pumping performance.

In preferred embodiments, dittmarite is formed directly from the reaction between magnesium hydroxide and/or magnesium oxide with ammonium dihydrogen phosphate. In order to preferably minimize conversion of dittmarite to struvite in the reactor vessel, the temperature inside the reactor vessel is preferably kept sufficiently high so that struvite is thermally unstable and does not form. Preferably, the temperature inside the reactor vessel is above about 55° C., more preferably above about 60° C., and most preferably above about 100° C.

The reaction of magnesium hydroxide and/or magnesium oxide with ammonium dihydrogen phosphate is mildly exothermic. Accordingly, this reaction generates heat, which raises the temperature of the reactants and product inside the reactor vessel. The temperature inside the reactor vessel is preferably monitored during the reaction. Heat can be supplied to the reactor vessel to maintain the temperature inside the reactor vessel sufficiently high to make struvite thermally unstable. For example, heat can be supplied to the reactor vessel to ensure that the temperature is above about 55° C., more preferably above about 60° C., and most preferably above about 100° C. during the reaction. Heat can be supplied to the reactor vessel by any suitable source.

To minimize the transformation of dittmarite formed by the reaction to struvite, the temperature of the magnesium ammonium phosphate containing slurry in the reactor vessel is preferably maintained sufficiently high after the reaction has occurred.

The reaction to form dittmarite is preferably performed in a sealed reactor vessel under pressure. Mild pressure is generated during the reaction at the preferred temperatures described above.

EXAMPLE

An experimental example was performed to demonstrate that dittmarite can be produced directly in slurry form, and at a high purity level, by reacting environmentally friendly reactants by the above-described processes. Particularly, magnesium hydroxide was reacted with ammonium dihydrogen phosphate to form dittmarite having high purity.

A solution was formed by adding 50 g of ammonium dihydrogen phosphate (MAP) to 250 ml of deionized water in a container. The solution was stirred. A slurry was formed by adding 25 g of magnesium hydroxide to 183 mL of deionized water in another container. The amounts of water in the solution and slurry were determined based on an estimated final solids concentration of about 16 wt. %.

The magnesium hydroxide slurry was placed in a sealed reactor vessel. The slurry was agitated in the reactor vessel and heated to boiling. The ammonium dihydrogen phosphate solution was added to the slurry in the reactor vessel. Samples were taken from the reactor vessel at intervals of time (to monitor reaction kinetics) and dried immediately for analysis.

The dried samples were analyzed to determine the degree of reaction completeness, i.e., the completeness of the reaction to form $NH_4MgPO_4 \cdot H_2O$, or dittmarite. Using thermogravimetric analyses (TGA), TGA curves were generated. The weight loss contributed to the degradation of unreacted magnesium hydroxide ($Mg(OH)_2$) to magnesium oxide (MgO) was determined. Because some weight loss in the curve in the temperature range for the decomposition of magnesium hydroxide is also contributed to the degradation of magnesium ammonium phosphate, the weight loss from the magnesium ammonium phosphate within the same temperature range was determined using a high purity magnesium ammonium phosphate. The two values were subtracted to obtain the true weight loss due to degradation of unreacted magnesium hydroxide. The amount of unreacted ammonium dihydrogen phosphate was also determined.

Figure 2:
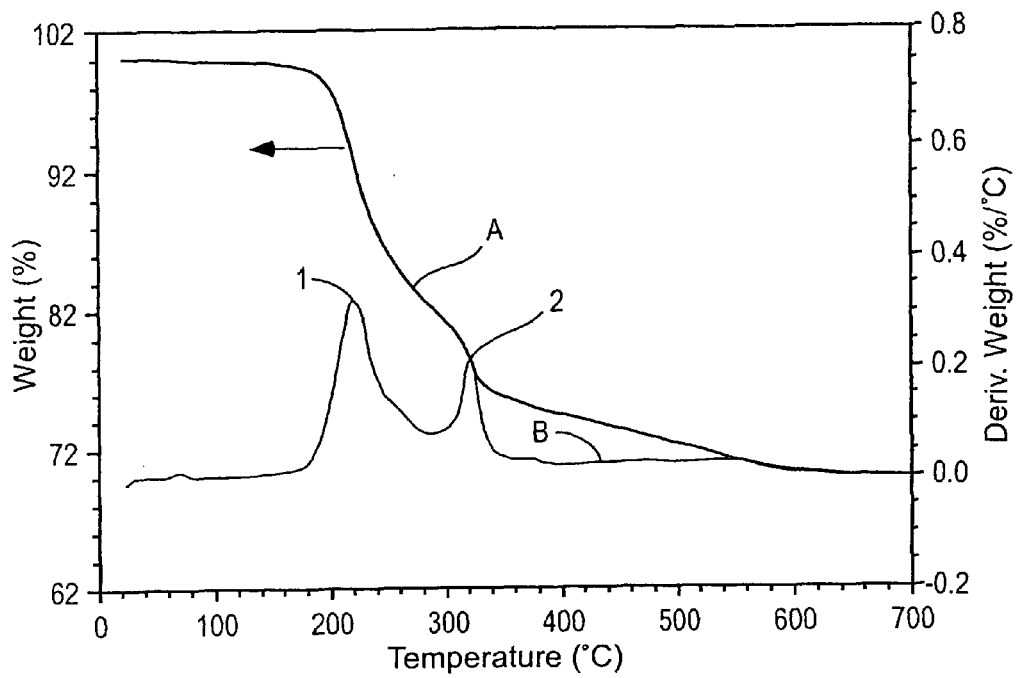
FIG. 2 shows exemplary thermogravimetric analysis (TGA) and derivative (DTGA) curves determined for a sample removed from a reactor vessel after four minutes.

FIG. 2 shows an exemplary TGA curve A and an exemplary DTGA curve B for a sample removed from the reactor vessel after 4 minutes. TGA curve A shows the percentage of the starting sample weight remaining versus the temperature to which the sample was heated. DTGA curve B shows the derivative weight, indicating the rate of change of the starting sample weight versus temperature. DTGA curve B includes peaks 1 and 2 formed during heating of the sample. Peak 1 relates to AMP, while peak 2 relates to the degradation of $Mg(OH)_2$.

Figure 3:
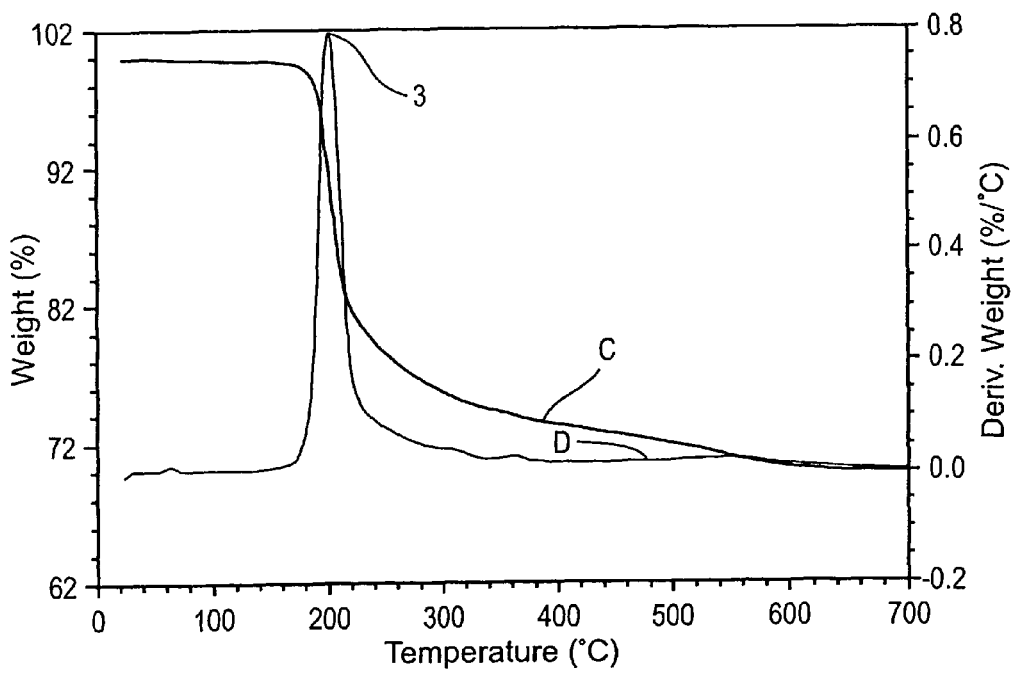
FIG. 3 shows exemplary TGA and DTGA curves determined for a sample removed from a reactor vessel after thirty minutes.

FIG. 3 shows an exemplary TGA curve C and an exemplary DTGA curve D for a sample removed from the reactor vessel after 30 minutes. DTGA curve D includes peak 3, which relates to AMP, but does not include a peak related to the degradation of $Mg(OH)_2$. DTGA curve D shows that substantially no $Mg(OH)_2$ was present in the sample after 30 minutes.

Table 1 sets forth numerical values determined from the samples taken from the reactor vessel at different times.

TABLE 1

| Time (min) | Unreacted $Mg(OH)_2$ (wt. %) | Unreacted MAP (wt. %) | Dittmarite Produced (wt. %) |
|---|---|---|---|
| 2 | 14.227 | 28.061 | 57.712 |
| 4 | 12.037 | 23.742 | 64.221 |
| 6 | 4.062 | 8.011 | 87.927 |
| 8 | 3.117 | 6.148 | 90.734 |
| 10 | 2.323 | 4.582 | 93.096 |
| 15 | 1.901 | 3.749 | 94.350 |
| 20 | 1.333 | 2.630 | 96.037 |
| 25 | 0.800 | 1.577 | 97.623 |
| 30 | 0.704 | 1.388 | 97.908 |

As shown in Table 1, the product formed after 30 minutes of reaction contained about 98 wt. % dittmarite, and contained substantially no magnesium hydroxide, as described above. The example demonstrated that high yields of dittmarite containing slurries of a high purity of preferably at least 95 wt. %, and more preferably at least 97 wt. %, can be produced by embodiments of the processes by reacting environmentally friendly reactants.

Production of Paper Containing Dittmarite

Figure 4:
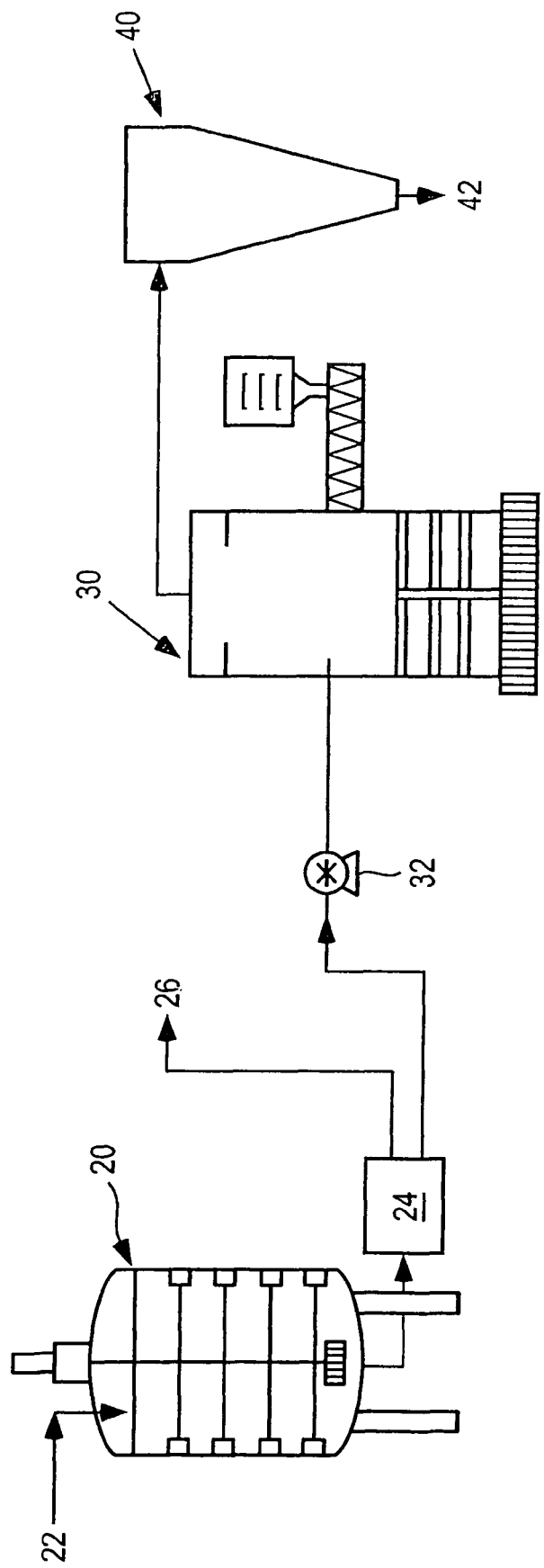
FIG. 4 illustrates an exemplary apparatus for practicing embodiments of processes that produce dittmarite-containing slurries, which can be fed to a cigarette paper making process, or to a drying process.

The monohydrate form of magnesium ammonium phosphate is the desirable form of magnesium ammonium phosphate fillers in cigarette paper. Dittmarite containing slurry produced by reacting environmentally friendly reactants by the above-described processes can be mixed with feedstock of a paper making apparatus 26 (FIG. 4). In preferred embodiments, the dittmarite containing slurry is fed directly from the reactor vessel, in which it is produced, to the paper making apparatus. In order to prevent the conversion of the magnesium ammonium phosphate in the monohydrate form to the hexahydrate form, it is preferable to maintain the as-produced slurry at a temperature above 55° C., more preferably above 60° C., until it is incorporated into paper making feedstock of the paper making machine. The paper making feedstock is preferably heated to a temperature above 60° C. This slurry temperature can be maintained by feeding the slurry from the reactor vessel to the paper making machine sufficiently quickly so that the slurry does not have time to cool down to a temperature at which dittmarite may transform to struvite. If needed, the slurry can be heated by any suitable heating source during feeding of the slurry to the paper making process to maintain the slurry temperature above the desired temperature, e.g., above 60° C., to avoid any potential phase transformation to struvite.

Feeding the hot slurry directly to the paper making machine can eliminate the need to supply additional heat to the paper making equipment to maintain a temperature above the phase transition temperature of dittmarite to struvite. Accordingly, energy consumption can be reduced in the paper making process.

In a paper making operation, dittmarite can be supplied directly to a tank in which the dittmarite is mixed with one or more components of the paper making feedstock, preferably at a temperature and/or pressure sufficient to maintain stability of the reaction product, i.e., prevent transformation to struvite. In an exemplary cigarette paper making process, the overall process steps can include:

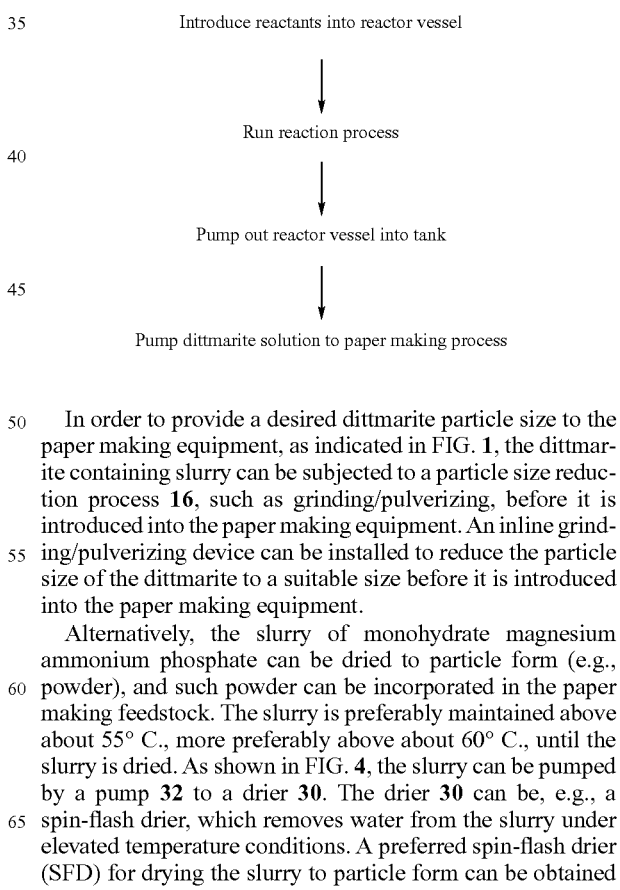

In order to provide a desired dittmarite particle size to the paper making equipment, as indicated in FIG. 1, the dittmarite containing slurry can be subjected to a particle size reduction process 16, such as grinding/pulverizing, before it is introduced into the paper making equipment. An inline grinding/pulverizing device can be installed to reduce the particle size of the dittmarite to a suitable size before it is introduced into the paper making equipment.

Alternatively, the slurry of monohydrate magnesium ammonium phosphate can be dried to particle form (e.g., powder), and such powder can be incorporated in the paper making feedstock. The slurry is preferably maintained above about 55° C., more preferably above about 60° C., until the slurry is dried. As shown in FIG. 4, the slurry can be pumped by a pump 32 to a drier 30. The drier 30 can be, e.g., a spin-flash drier, which removes water from the slurry under elevated temperature conditions. A preferred spin-flash drier (SFD) for drying the slurry to particle form can be obtained from APV Anhydro of Tonawanda, N.Y. Once dry, the dittmarite remains stable. If desired, the resultant powder can be further reduced in particle size using known milling or grinding techniques.

For paper making, the particle size of dittmarite is preferably in the range of approximately 2 μm to 8 μm, more preferably in the range of 2 μm to 4 μm. As shown in FIG. 4, the dried slurry particles can be subjected to a separating step to separate the particles into any desired size fractions. For example, the dried slurry particles and air can be fed to a cyclone 40 to provide sized particles 42.

The cigarette making process can produce traditional cigarettes, or other less traditional cigarettes, such as cigarettes usable with electronic smoking devices, which are described in U.S. Pat. No. 6,289,898.

Thus, embodiments of the processes can conserve energy by feeding the slurry directly from the reactor vessel to the paper making equipment, without first drying and then reslurrying dried dittmarite. Producing dittmarite at the site of the paper making process can eliminate storage and transportation costs, and minimize potential transformation of dittmarite to struvite during such storage.

Embodiments of the processes also eliminate problems associated with the use of corrosive, dangerous reactants including phosphoric acid, such as handling, special permit requirements, and controlling strongly exothermic reactions.

While the invention has been described in detail with reference to specific embodiments thereof, it will be apparent to those skilled in the art that various changes and modifications can be made, and equivalents employed, without departing from the scope of the appended claims.

What is claimed is:

1. A process of making paper, comprising:
   introducing at least magnesium, phosphate and nitrogen into a vessel by introducing at least two reactants into the vessel, wherein one of the at least two reactants is magnesium acetate;
   reacting the at least two reactants to produce a slurry comprising substantially dittmarite;
   maintaining the slurry at a sufficiently high temperature to substantially prevent the transformation of the dittmarite to struvite; and
   combining the slurry with paper making feedstock in a paper making process.

2. The process of claim 1, further comprising reducing particle size of the dittmarite before combining the slurry with the paper making feedstock.

3. The process of claim 1, further comprising drying the slurry and then reslurrying dried dittmarite before combining the slurry with the paper making feedstock.

4. The process of claim 1, wherein the slurry is fed directly from the vessel to the paper making process without transformation of the dittmarite to the hexahydrate form of magnesium ammonium phosphate.

5. The process of claim 1, wherein the slurry is maintained at a temperature above a phase transition temperature of dittmarite to a hexahydrate form of the magnesium ammonium phosphate from when the slurry is produced until the slurry is combined with the paper making feedstock.

6. The process of claim 5, wherein the slurry is maintained at a temperature of at least about 60° C. from when the slurry is produced until the slurry is combined with the paper making feedstock.

7. The process of claim 6, further comprising heating the slurry to a temperature of at least about 60° C. in the vessel.

8. The process of claim 1, wherein the paper making process is a cigarette paper making process.

9. A process of making paper, comprising:
   introducing at least magnesium, phosphorous and nitrogen into a vessel by introducing at least two reactants into the vessel, the at least two reactants not including phosphoric acid, wherein one of the at least two reactants is magnesium acetate;
   reacting the at least two reactants to produce a slurry comprising substantially dittmarite; and
   combining the slurry with paper making feedstock in a paper making process.

10. The process of claim 9, further comprising reducing particle size of the dittmarite before combining the slurry with the paper making feedstock.

11. The process of claim 9, further comprising drying the slurry and then reslurrying dried dittmarite before combining the slurry with the paper making feedstock.

12. The process of claim 9, wherein the slurry is fed directly from the vessel to the paper making process without transformation of the dittmarite to the hexahydrate form of magnesium ammonium phosphate.

13. The process of claim 9, wherein the slurry is maintained at a temperature above a phase transition temperature of dittmarite to a hexahydrate form of the magnesium ammonium phosphate from when the slurry is produced until the slurry is combined with the paper making feedstock.

14. The process of claim 9, wherein the paper making process is a cigarette paper making process.

* * * * *